(12) United States Patent
Oddo et al.

(10) Patent No.: US 9,247,300 B2
(45) Date of Patent: Jan. 26, 2016

(54) CONTENT NOTIFICATION AND DELIVERY

(75) Inventors: Anthony Scott Oddo, Boston, MA (US); Thomas L. Renger, Long Beach, CA (US); Devin F. Hosea, New York, NY (US); Nathaniel J. Thurston, Reykjavik (IS); Albert H. Perdon, Cerrito, CA (US)

(73) Assignee: Cox Communications, Inc., Atlanta, GA (US)

( * ) Notice: Subject to any disclaimer, the term of this patent is extended or adjusted under 35 U.S.C. 154(b) by 921 days.

(21) Appl. No.: 10/552,784

(22) PCT Filed: Apr. 2, 2004
(Under 37 CFR 1.47)

(86) PCT No.: PCT/US2004/010311
§ 371 (c)(1),
(2), (4) Date: Jun. 9, 2006

(87) PCT Pub. No.: WO2004/091187
PCT Pub. Date: Oct. 21, 2004

(65) Prior Publication Data
US 2007/0169148 A1  Jul. 19, 2007

Related U.S. Application Data

(60) Provisional application No. 60/459,933, filed on Apr. 3, 2003.

(51) Int. Cl.
*H04N 7/10* (2006.01)
*H04N 7/025* (2006.01)
(Continued)

(52) U.S. Cl.
CPC ....... *H04N 21/4662* (2013.01); *H04N 5/44543* (2013.01); *H04N 7/173* (2013.01); *H04N 7/17336* (2013.01); *H04N 21/252* (2013.01); *H04N 21/25891* (2013.01); *H04N 21/2668* (2013.01); *H04N 21/4383* (2013.01); *H04N 21/443* (2013.01); *H04N 21/44222* (2013.01); *H04N 21/4532* (2013.01);
(Continued)

(58) Field of Classification Search
None
See application file for complete search history.

(56) References Cited

U.S. PATENT DOCUMENTS 5,790,935 A * 8/1998 Payton ............... H04N 7/17336
                                               348/E7.073
5,983,214 A * 11/1999 Lang et al. .................... 707/1
(Continued)

FOREIGN PATENT DOCUMENTS

CN         1290452 A       4/2001
WO      WO 97/47135 A     12/1997
(Continued)

OTHER PUBLICATIONS

International Search Report corresponding PCT/US2004/010311, Dec. 10, 2004, Sedna Patent Service, LLC.

*Primary Examiner* — Jonathan V Lewis
(74) *Attorney, Agent, or Firm* — Merchant & Gould P.C.

(57) ABSTRACT

Disclosed are methods and systems for displaying content recommendations to a television viewer. In one aspect of the invention, when the user changes channel, the system displays content recommendations to the user before going to the next channel. The recommendations are based on user profiles and/or aggregated multi-user content. In a further aspect, the user can decide on one of the recommendations (or answer a yes/no query) to migrate to the corresponding content.

13 Claims, 11 Drawing Sheets

(51) Int. Cl.

| | | |
|---|---|---|
| *G06F 3/00* | (2006.01) | |
| *G06F 13/00* | (2006.01) | |
| *H04N 5/445* | (2011.01) | |
| *H04N 21/466* | (2011.01) | |
| *H04N 7/173* | (2011.01) | |
| *H04N 21/25* | (2011.01) | |
| *H04N 21/258* | (2011.01) | |
| *H04N 21/2668* | (2011.01) | |
| *H04N 21/438* | (2011.01) | |
| *H04N 21/442* | (2011.01) | |
| *H04N 21/443* | (2011.01) | |
| *H04N 21/45* | (2011.01) | |
| *H04N 21/462* | (2011.01) | |
| *H04N 21/475* | (2011.01) | |
| *H04N 21/4788* | (2011.01) | |
| *H04N 21/482* | (2011.01) | |
| *H04N 21/488* | (2011.01) | |
| *H04N 21/84* | (2011.01) | |

(52) U.S. Cl.
CPC ........ *H04N 21/466* (2013.01); *H04N 21/4622* (2013.01); *H04N 21/4668* (2013.01); *H04N 21/4758* (2013.01); *H04N 21/4788* (2013.01); *H04N 21/4826* (2013.01); *H04N 21/4882* (2013.01); *H04N 21/84* (2013.01)

(56) References Cited

U.S. PATENT DOCUMENTS

| | | | |
|---|---|---|---|
| 6,005,597 A | | 12/1999 | Barrett |
| 6,163,316 A | | 12/2000 | Killian |
| 6,177,931 B1 | * | 1/2001 | Alexander et al. ............ 725/52 |
| 6,727,914 B1 | * | 4/2004 | Gutta ............................ 715/719 |
| 6,934,964 B1 | * | 8/2005 | Schaffer et al. ................ 725/46 |
| 7,296,284 B1 | * | 11/2007 | Price et al. ..................... 725/39 |
| 7,734,680 B1 | * | 6/2010 | Kurapati et al. ............. 709/203 |
| 2002/0010922 A1 | | 1/2002 | Darin |
| 2002/0069403 A1 | * | 6/2002 | Itoh et al. ......................... 725/9 |
| 2002/0108113 A1 | * | 8/2002 | Schaffer et al. ................ 725/46 |
| 2002/0157096 A1 | * | 10/2002 | Hane et al. ...................... 725/46 |
| 2002/0178257 A1 | | 11/2002 | Cerrato |
| 2002/0178440 A1 | * | 11/2002 | Agnihotri et al. ............. 725/10 |
| 2002/0194586 A1 | | 12/2002 | Gutta et al. |
| 2002/0199194 A1 | * | 12/2002 | Ali .................................. 725/46 |
| 2003/0013433 A1 | * | 1/2003 | alSafadi et al. ............. 455/414 |
| 2003/0051240 A1 | * | 3/2003 | Schaffer et al. ................ 725/34 |
| 2003/0101451 A1 | * | 5/2003 | Bentolila et al. .............. 725/34 |
| 2003/0229895 A1 | * | 12/2003 | Jasinschi et al. .............. 725/46 |
| 2004/0003392 A1 | * | 1/2004 | Trajkovic et al. ............. 725/10 |
| 2004/0003400 A1 | * | 1/2004 | Carney et al. .................. 725/42 |
| 2004/0031058 A1 | * | 2/2004 | Reisman ....................... 725/112 |
| 2004/0040040 A1 | * | 2/2004 | Danker et al. .................. 725/46 |
| 2004/0073919 A1 | * | 4/2004 | Gutta et al. ..................... 725/35 |
| 2004/0172662 A1 | * | 9/2004 | Danker et al. ................ 725/135 |
| 2004/0216168 A1 | * | 10/2004 | Trovato et al. ............... 725/135 |
| 2005/0193425 A1 | * | 9/2005 | Sull et al. ..................... 725/135 |
| 2006/0212900 A1 | * | 9/2006 | Ismail et al. ................... 725/34 |

FOREIGN PATENT DOCUMENTS

| | | |
|---|---|---|
| WO | WO 99/04561 | 1/1999 |
| WO | WO 00/33224 A1 | 6/2000 |
| WO | WO 00/49801 A1 | 8/2000 |
| WO | WO 01/46843 A | 6/2001 |

\* cited by examiner

CONTENT NOTIFICATION AND DELIVERY

CROSS REFERENCE TO RELATED APPLICATIONS

The present application is related to and claims priority from commonly owned U.S. Provisional Application Ser. No. 60/459,933 filed on Apr. 3, 2003 entitled "Content Notification and Delivery."

INCORPORATION BY REFERENCE

Applicants hereby incorporated herein by reference, as if set forth in their entireties, the following patents, patent publications and application:

Commonly owned U.S. patent application Ser. No. 10/117,654 filed on Apr. 5, 2002 entitled "Method and Apparatus for Identifying Unique Client Users from User Behavior Data."

U.S. patent application Ser. No. 09/771,629 filed on Jan. 30, 2001.

U.S. Pat. No. 6,177,931 filed on Jul. 21, 1998.

U.S. Pat. No. 6,005,597 filed on Oct. 27, 1997.

U.S. Pat. No. 6,163,316 filed on Oct. 3, 1997.

WIPO Publication No. WO 00/49801A1 published on Aug. 24, 2000.

WIPO Publication No. WO 00/33224A1 published on Jun. 8, 2000.

FIELD OF INVENTION

The present invention relates generally to interactive television (iTV) and other content delivery systems and, more particularly, to methods and systems for notifying a user of various content items based on user profile information or selected group viewing and providing real time, personalized recommendations to users.

BACKROUND OF THE INVENTION

With hundreds of television (TV) channels and scheduled programs from which to choose, together with personal video recorder (PVR)-recorded shows, pay-per-view (PPV) offerings, video-on-demand (VOD), TV viewers are faced with an overwhelming choice of entertainment and other content options.

In response, various electronic or interactive programming guide (EPG/IPG) systems and program notification systems have been proposed or developed to enhance TV or streaming video viewers' ability to navigate through and select content. Examples of such systems are set forth in the following U.S. and foreign patents, applications, publications documents, among others, the disclosures of which are incorporated herein by reference above, as if set forth in their entirety here.

Most EPG systems are capable of generating on-screen displays of content, some in a time- and channel-based grid format. While such displays have utility, they generally do not enable users to quickly and easily find content of interest. If a user decides, during viewing of a first television show, that he or she is interested in alternatives, the user must use the remote control buttons to leave the show he or she is presently viewing and direct the system to display a list of alternatives. The user must therefore interrupt his or her enjoyment of the presently viewed content in order to see (or even become generally aware of) one or more alternatives.

In addition, since alternatives are not presented during viewing of the television show, the user must actively decide that he or she is interested in alternatives (even without knowing what alternatives are available), in order to see a listing of alternatives.

Also, many on-screen displays typical of the prior art, such as that shown in FIG. 1, are relatively complex and potentially daunting to many users. If these on-screen displays are not generated with reference to a recommendation process, the displays become populated by content of little or no interest to the user.

As a result, users often miss out on programming that is of interest to them. Either they are unaware that such a program exists or they may not be aware of when the programming is available. Several inventions have been designed to help users avoid missing desired programming.

Some of the early systems, like VCR Plus, provided users with an interface that allowed them to easily program their VCR to record programs of interest. Similarly, most Electronic Programming Guides (EPGs) have programmable reminders that allow users to select a program from an on-screen guide and when the program airs it will prompt the user to change the channel or will change the channel automatically. The drawback to these systems is that they require the user to be actively in search of a particular program in order to set the reminders.

In response to these drawbacks, Darin et al. provides an active program notification system (APNS). The Darin APNS system requires users to set parameters that define the types of programs the user is interested in, searches for programs matching the user-inputted parameters, and sends reminders when those programs are about to air. The drawback to this approach is that it requires substantial user interaction to set up. Research shows that adoption of TV features requiring a substantial amount of user input is generally low (about 15% or less). Also, few users that go through the initial set up rarely ever bother to later update their data. An example of this is the "Favorites" button on many of the remote controls that come with televisions or set top boxes (STB). Few users take the time to go through the process of programming their favorites button and, if they do, users rarely go back to update their favorites button. Thus, over time a user's information becomes outdated. In the case of the "favorites" button, a user will just stop using the button if the information is outdated. This is particularly inefficient in the APNS case since a user will be constantly peppered with notifications for programs they are not interested in. It is therefore desirable to provide methods, devices and systems that enable users to be notified of content the users are interested in without requiring input on the part of the user. It is also desirable to provide methods, devices and systems that remain relevant as the users habits change.

Finally, some viewers aspire to be notified of the programs or content their friends are watching. This can be referred to as the "water cooler" effect, wherein users wish to watch and then discuss the next day those shows watched both by themselves and their friends. Therefore, it is desirable to provide such methods, devices and systems that enable users to receive notice of content or programs that a group of their friends are viewing without any direct input from the user or their friends, except for some initial data input.

SUMMARY OF THE INVENTION

Disclosed are methods and systems for displaying content recommendations to a television viewer. In one aspect of the invention, when the user changes channel, the system displays content recommendations to the user before going to the next channel. The recommendations are based on user profiles and/or aggregated multi-user data. In a further aspect, the user can decide on one of the recommendations (or answer a yes/no query) to migrate to the corresponding content.

A further aspect of the present invention provides methods and systems for, via an Interactive Program Guide (IPG), enabling a user to link to content or programs. In a content distribution system comprising an interactive programming guide (IPG), the present invention comprises the steps of generating user profiles, processing incoming content or programming, rating available content based on how similar the content is with respect to a user's profile, providing, at a change in system state, a user perceptible indicator to notify the user of highly rated content and enabling the user to decide whether to view the recommended content. The system also comprises the steps of enabling a user to input identification information for a plurality of other users, processing content and programming viewed by the group of other users, determining whether a plurality of group members are viewing the same content or programming, providing, at a change in system state, a user perceptible indicator to notify the user of content being viewed by a plurality of group members and enabling the user to decide whether to view the content being viewed by the plurality of group members.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION

Overview:

Disclosed are methods and systems for displaying content recommendations to a television viewer. In one aspect of the invention, when the user changes channel, the system displays content recommendations to the user before going to the next channel. The recommendations are based on user profiles and/or aggregated multi-user content. In a further aspect, the user can decide on one of the recommendations (or answer a yes/no query) to migrate to the corresponding content.

The present invention relates generally to television program selection by users and, more particularly, to methods and systems for notifying a user of various programs based on user profiles to provide real time, personalized television program recommendations to users. The methods and systems described herein can be used with terrestrial broadcast television, cable television, direct satellite broadcast television, or any other mechanism or system for delivering video content.

Exemplary methods of identifying a current user can be found in commonly owned U.S. patent application Ser. No. 10/117,654 filed Apr. 5, 2002 and entitled "Method and Apparatus For Identifying Unique Client Users From User Behavioral Data," which is incorporated herein by reference and discussed further below. In accordance with the present invention, these profiling systems are based on the viewing behavior of the user and do not require direct input from the user.

Figure 1:
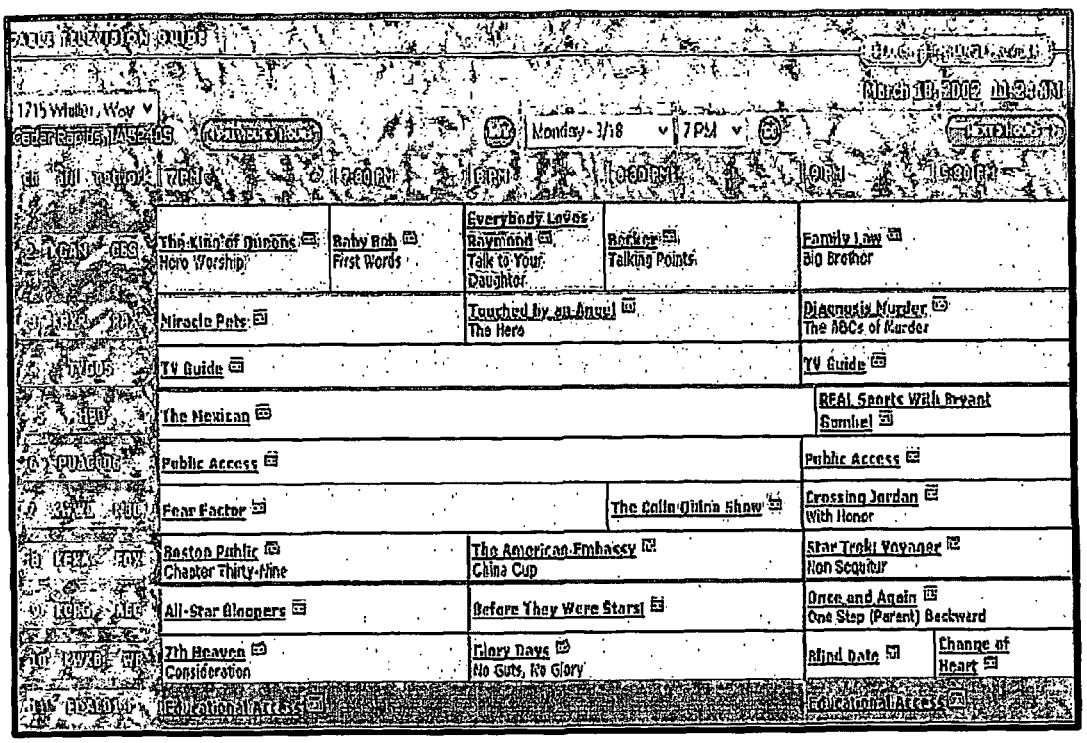
FIG. 1 depicts an interactive program guide typical of the prior art
Figure 2A:
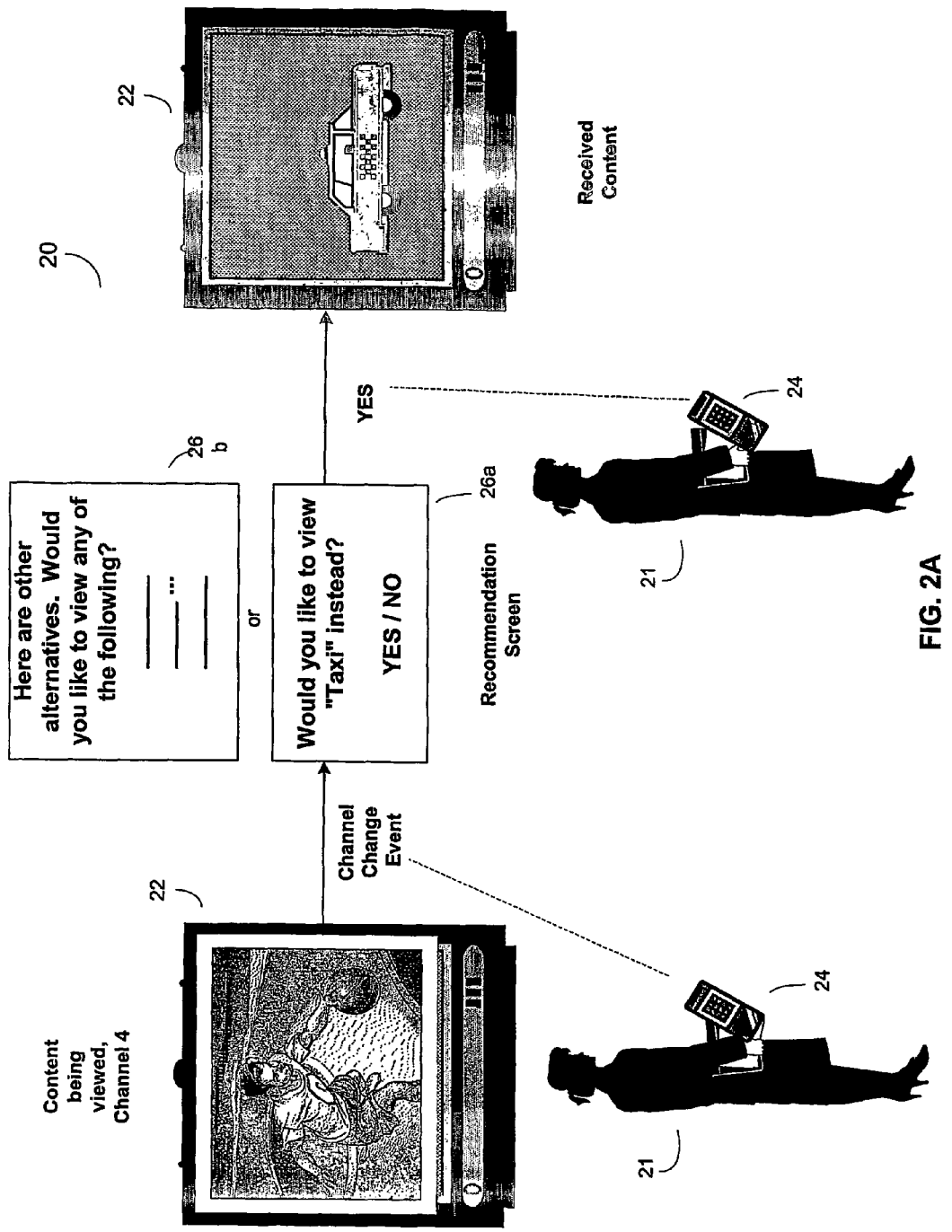
FIG. 2A is a schematic representation of the operation of a content recommendation system in accordance with the invention.

FIG. 2A is a schematic diagram depicting the operation of a system 20 in accordance with the invention. As shown in FIG. 2A, a user 21 may, at a first time, be watching first viewing content on, e.g., basketball on Channel 4, on a video monitor or other content delivery device 22. Subsequently, the user 21 may decide to change channels by using, e.g., remote control device 24. Remote control device 24 may operate in a conventional manner, such as by sending a coded infra-red (IR) signal to delivery device 22, whereupon, the system 20 provides, and the delivery device 22 displays, a recommendation screen 26a or 26b. The recommendation screen may either provide a simple Yes/No query (26a) or a multi-line list of recommendations (26b). The user can then use the remote control device 24 to interact with the recommendation screen (26a or b) in a manner described in greater detail elsewhere in this document, to select recommended viewing content, which is then displayable by the delivery device 22 (e.g., "Taxi"). In an alternative embodiment, the system 20 could also be responsive not only to commands from a remote control device, but could also provide an audible recommendation ("would you like to view Taxi instead?") and be responsive to a viewer's voice commands.

As described in greater detail elsewhere in this document, the recommendation screen can be generated based upon either user profiles or aggregated multi-user data.

Figure 2:
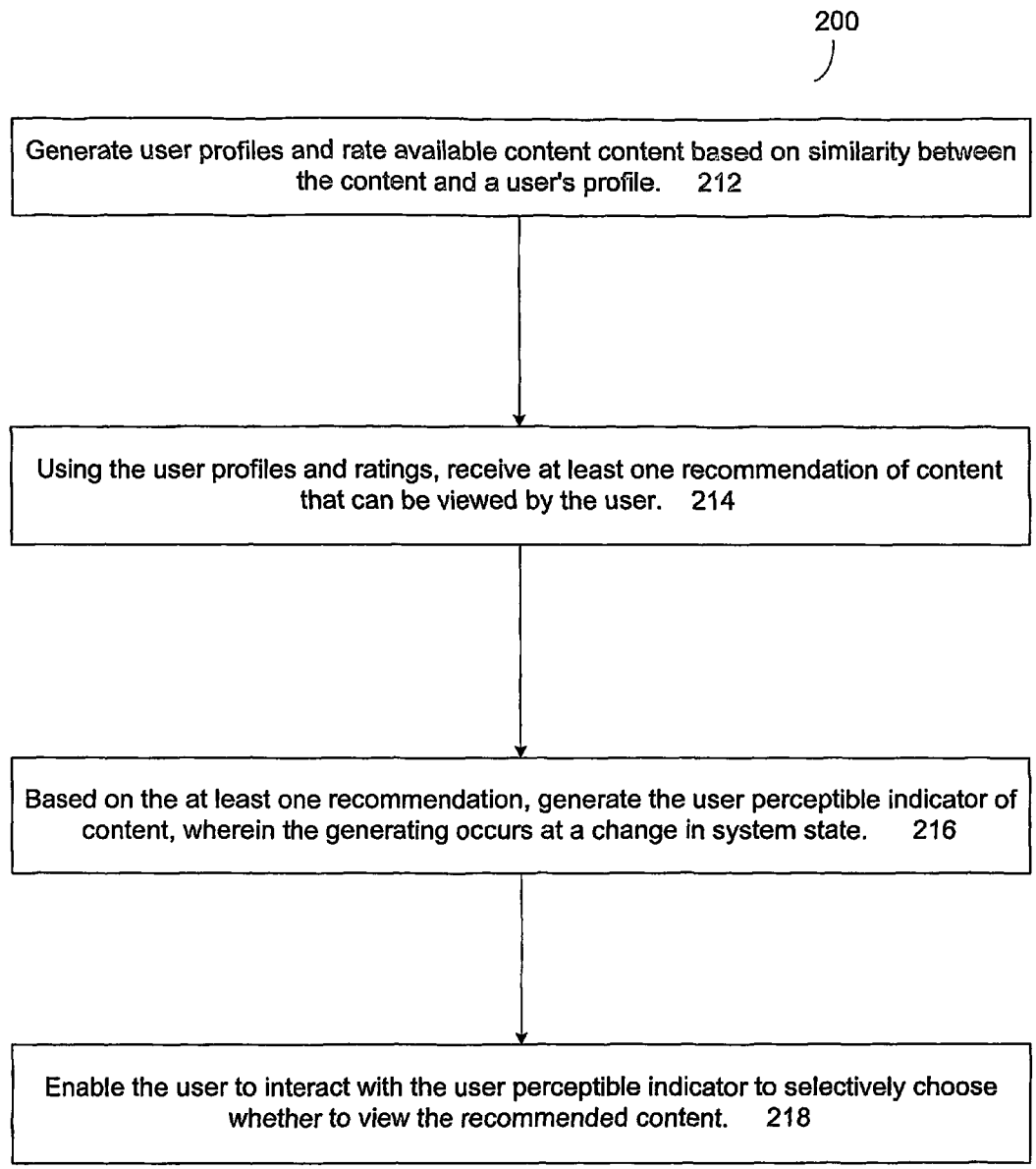
FIG. 2 is a flow diagram of a content notification and delivery method in accordance with the invention.

Referring to FIG. 2, a flow diagram depicting one practice of the present invention, a method 200 generates user profiles and rates available content or programs based on how similar the content is to a user's profile as depicted in step 212. Using the user profiles and ratings, at least one content recommendation viewable is generated by the user, as shown in step 214. Based on the recommendation, the present invention generates a user perceptible indicator of content at a change in system state as depicted at step 216. The user interacts with the indicator to selectively choose whether to view the recommended program, as shown at step 218. In one aspect of the present invention, the indicator can be provided at a change in system state such as the following: activating the content delivery system, turning on a television, or changing a channel.

Unlike prior art systems that employ some set number of alerts for each half hour, the present invention notifies a user of highly rated programs (e.g., programs receiving a rating higher than some predetermined threshold) of interest to the user based on the user's viewing history and habits.

Figure 3:
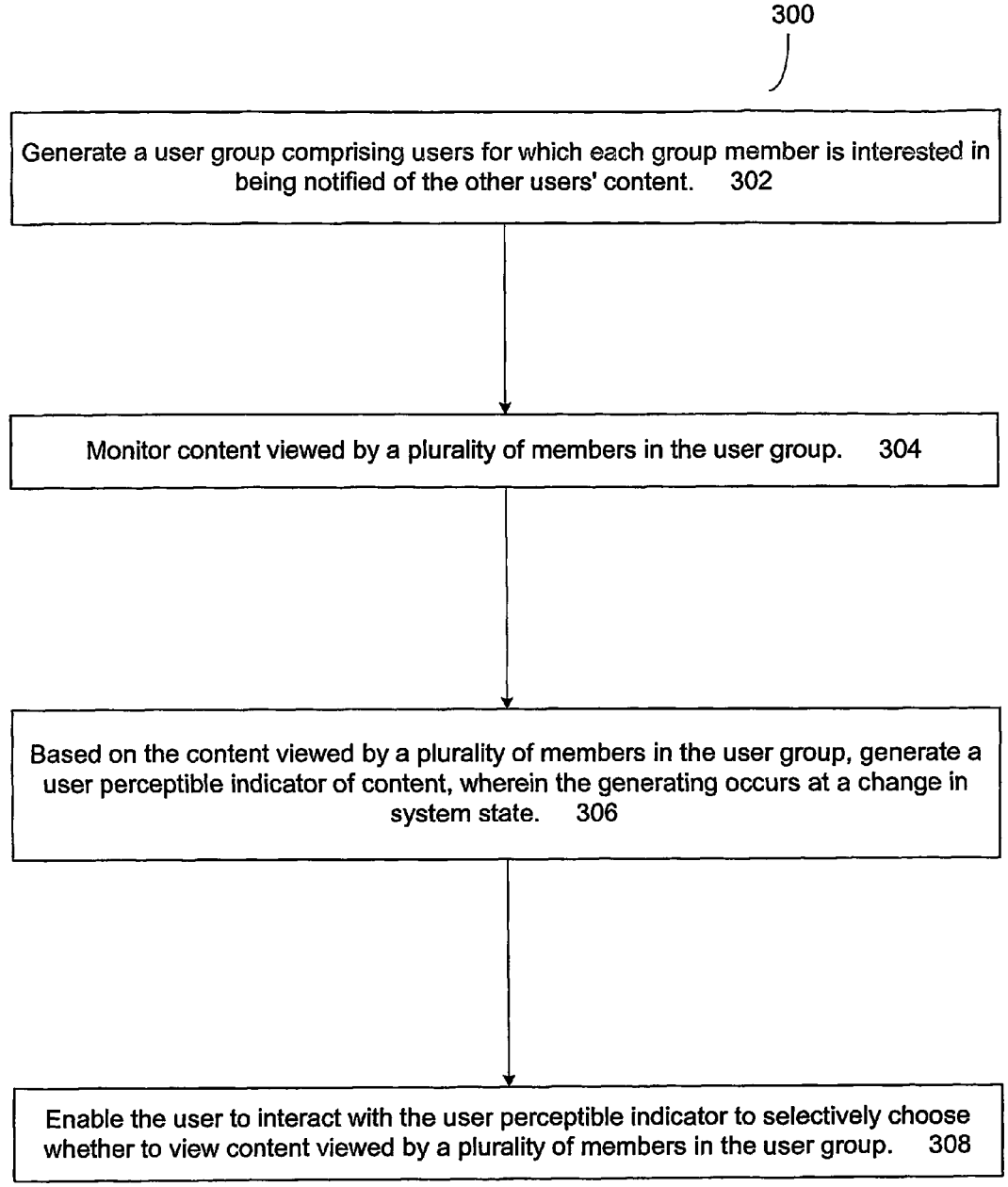
FIG. 3 is a flow diagram of a further content notification and delivery method in accordance with the invention.

In another aspect, a user can create a group of users, typically friends, whose content or programming the user is interested in being notified of by an indicator. As shown in FIG. 3, a method 300 generates a user group comprising users for which each group member is interested in being notified of the other users' content, as shown in step 302. For example, the user can provide a group member's unique identifier, such as a group member's name or combination of name and corresponding unique identifier.

Next, the present invention monitors the content viewed by a plurality of members in the user group, as depicted in step 304. Based on the content viewed by a plurality of members in the user group, the present invention generates a user perceptible indicator of the content, wherein the generating occurs at a change in system state in accordance with step 306. Finally, the system 300 enables the user to interact with the user perceptible indicator to selectively choose whether to view the content viewed by a plurality of members in the user group, as shown at step 308.

For example, whenever a plurality of user group members is watching the same program, an indicator is sent to a user prompting the user to decide whether to switch to the program his or her friends are watching. Such an indicator is provided at a change in system state (e.g., activating the content delivery system, turning on a television, or changing a channel). Being notified of and subsequently viewing the content the user's friends are watching enables a user to participate in the "water cooler" effect, since the indicators correspond to programs that may be discussed the next day among friends. Also, this aspect can be integrated with personal video recording systems (PVRs) or Gemstar Guide Plus to allow these systems to automatically record programs that the user's friends are going to be talking about, ensuring that the user will never miss the programs even when a user is not at home.

Figure 4:
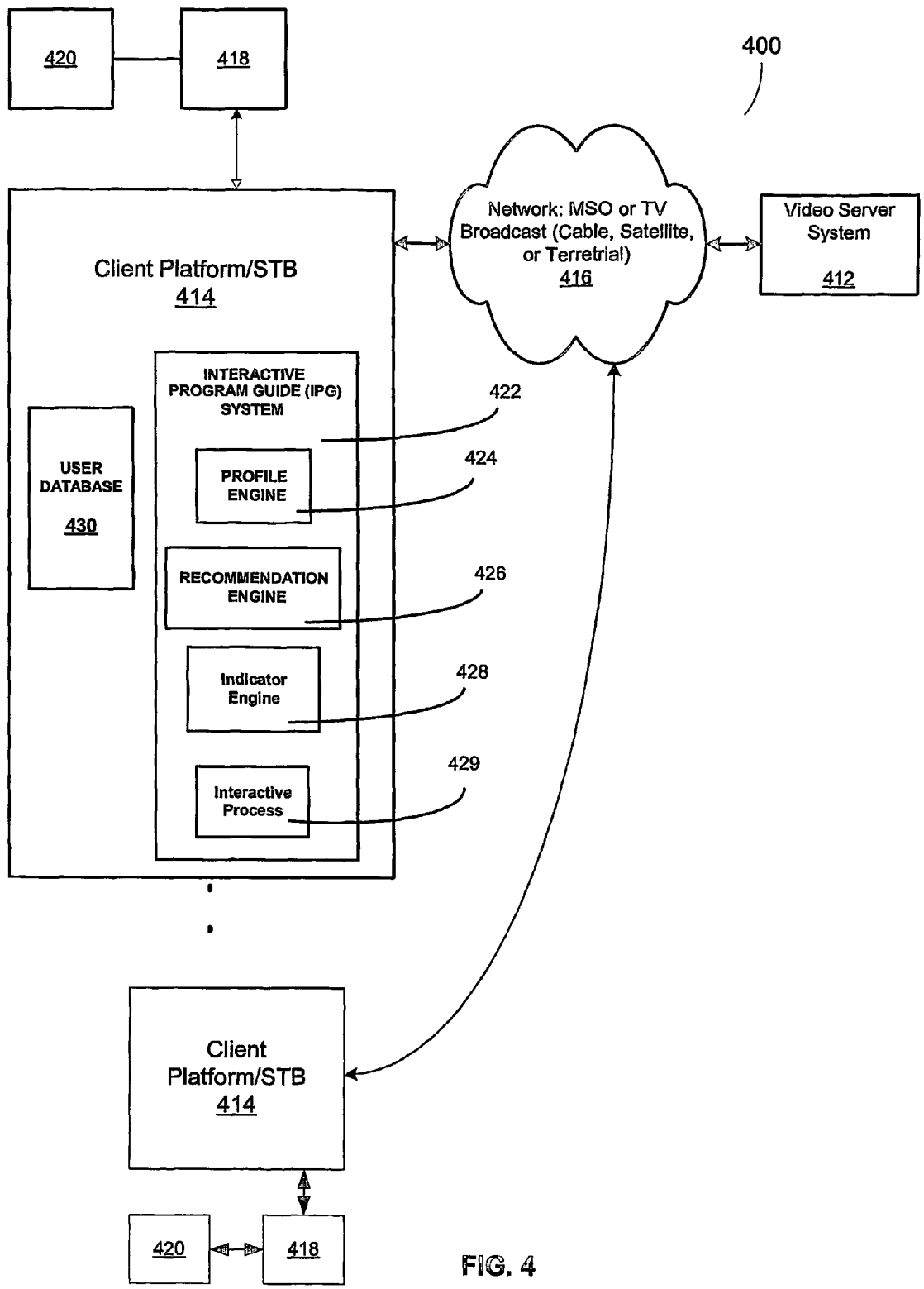
FIG. 4 illustrates a content delivery system in accordance with the invention.

User Profiles:

FIG. 4 schematically illustrates representative systems for generating user profiles from behavioral data in accordance with the present invention. In general, the system 400 includes a video server system 412 for delivering content to a plurality of client platform or devices 414 over a network 416. Each client platform 414 has an associated display device 418 for displaying the delivered content. Each client platform 414 also has a user input or interface interaction device 420 that enables the user to interact with a user interface on the client platform 414. Input devices 420 can include, but are not limited to infrared remote controls or other pointer devices. In some embodiments, the network 416 can comprise a television broadcast network such as digital cable television, direct broadcast satellite, and terrestrial transmission networks, and the client platform 414 can comprise television set-top boxes. The display device 418 can be, for example, a video or television monitor.

Referring again to FIG. 4, the server system 412 can comprise a video server, which sends data to and receives data from a platform device 414 such as a television set-top box or a digital set-top box.

The network 416 can comprise an interactive television network that provides two-way communications between the server 412 and various platform devices 414 with individual addressability of the platform devices 414.

The network 416 can also comprise a television distribution system such as a cable television network comprising, e.g., a nodal television distribution network of branched fiber-optic and/or coaxial cable lines. Other types of networked distribution systems are also possible including, e.g., direct broadcast satellite systems, off-air terrestrial wireless systems and others.

A user can operate the platform device 414, for example a set-top box, with a user interface interaction device 420 such as a remote control device such as an infrared remote control having a keypad. Also, the platform device can comprise a user database 430.

The interactive program guide 422 can comprise a profile engine 424, a recommendation engine 426, an indicator engine 428, and an interactive process 429.

User Profiling and Identification from Behavioral Data:

Various embodiments of the invention are directed to identifying a current individual user of a client device from a group of possible users. Such identification can be made from user behavioral data, particularly from input patterns detected by the use of input devices such as remote control devices. As will be described in further detail below, the detected input patterns from a current user are compared with a set of input pattern profiles, which can be developed over time and stored in a database for the group of possible users. In one embodiment, a user profile is generated by substantially matching the current input pattern with one of the stored pattern profiles, each of which is associated with one of the possible users.

Referring to FIG. 4, the database of input pattern profiles and software for detecting and matching current input patterns can reside at the user database 430 of client platform 414 or elsewhere in the network such as at the server 412 or distributed at some combination of locations.

Different types of input data patterns can be used separately or in combination for identifying current users. Input data patterns can include clickstream data and remote control device usage data.

Clickstream data generally relates to television surf stream data, which includes data on the particular television channels or programs selected by a user. Remote control device data relates to usage behavior of a remote control device, particularly to operate a television set. For this user data, a sub-algorithm can be provided for detecting and tracking recurring patterns of user behavior.

Referring again to FIG. 4, different television users have different television channel surfing styles and interests. The clickstream algorithm contained in profile engine 424 and described below extracts distinguishing features from raw clickstreams generated by users during viewing sessions. Recurrent patterns of behavior in various observed different clickstreams are detected and stored. Incoming clickstreams from a user client device are compared with these stored patterns, and the set of patterns most similar to the incoming clickstream pattern is output, along with their corresponding similarity scores.

During a viewing session, the clickstream generated by the current user can be distilled into a set of statistics so that different clickstreams can be easily compared and their degree of similarity measured. This degree of similarity can be the basis for associating different clickstreams as possibly having been generated by the same person. The following are sets of example clickstream statistics:

1) Total duration of visits to viewing of Top-N television programs or channels.

One set of clickstream statistics can be the Top N (N can be variable, but is usually 8-10) unique channels/programs that appear in the current clickstream, selected according to total duration of viewing of the channels/programs. The total duration is computed and stored. In addition to the Top-N channels/programs, a catch-all category named "Other" can also be maintained.

2) Transition frequencies among Top-N channels/programs.

Another set of clickstream statistics can be a matrix mapping "From" channels/programs to "To" channels/programs that captures the total number of all transitions from one channel/program to the next in the clickstream. Transitions can be tracked among the Top-N channels/programs as well as those in the "Other category." In addition, "Start" and "End" channels/programs can be used along with the "From" and "To" dimensions, respectively.

These statistics can be used to form a pattern of user surfing behavior. They can capture both the content of the clickstream (as represented by the content of the Top-N channels/programs), as well as some of the idiosyncratic surfing behavior of the user (as manifested, e.g., in transition behavior and proportion of sites or channels/programs that are "Other").

User profiling can take into account the possibility that user input patterns are dependent on time. For example, user viewing behavior can vary based on the time of day or the given hour of a week.

The similarity of clickstreams can be measured by calculating the similarity of statistics such as those described above between two different clickstreams. There are several different possible similarity metrics that can be used in distinguishing or comparing different clickstreams. Examples of such metrics include the following:

1) Dot-product of "Duration" Unit Vectors

Two "duration" vectors are considered to be similar if they point in the same direction in channels/programs-space, i.e., each clickstream visits many of the same Top-N channels/programs in similar proportions, regardless of the actual length or duration of the clickstream. This similarity is measured by computing the dot-product between the "duration" unit vectors. Perfect similarity returns a value of unity, no similarity returns zero. The similarity of "Other" values is preferably not included in this calculation since two clickstreams with identical "Other" values might have in fact no similarity at all.

2) Dot-product of Unit-vectorized "Transition" Matrices.

For similar reasons, the transition matrices can be compared using a dot-product metric. The matrices must first be vectorized (i.e., the elements are placed in a vector). Transitions to and from "Other" are considered generally significant and can be included in the calculation.

3) Similarity of "Other" Duration.

The proportion of time spent at "Other" channels/programs relative to the total user session time can be compared. Similarity is measured by computing for each of the two clickstreams to be compared the proportion of time spent at "Other" channels/programs, then dividing the smaller of the two by the larger.

4) Similarity of Total Duration.

This is a measure of similarity in the total duration of the clickstreams.

5) Similarity of Total Number of Distinct Channels/programs.

This is a measure of the similarity in the total number of distinct channels/programs appearing in these clickstreams.

Each of these similarity metrics can be computed separately. If multiple metrics are used, they can be combined using various techniques. For example, a composite similarity metric can be computed by multiplying a select subset of these metrics together. Trial and error on actual data can determine which subset is most suitable. However, the similarity between duration vectors and transition matrices are likely to be more useful.

A good similarity metric will result in a good separation between users who have reasonably different surfing habits, and will not overly separate clickstreams generated by the same individual when that person is manifesting reasonably consistent surfing behavior.

Clickstreams that have high similarity values can be considered possibly to have been generated by the same person. There are many possible ways to compute similarity. For example, one way to match a clickstream to one of a set of candidates is to select the candidate that has the highest similarity value. This technique is called a "hard match".

Alternatively, a somewhat more conservative approach can be to select a small group of very similar candidates rather than a single match. This group of candidates can subsequently be narrowed using some other criteria. This technique can be called finding a "soft match". A similarity threshold can be specified for soft matching. Soft matching is preferable when it is desired to match users according to multiple input pattern types such as keystroke and mouse dynamics in addition to clickstream behavior.

It is desirable to match incoming clickstreams with stored clickstream profiles representing recurrent clickstream patterns that have been observed over time. Each user is preferably associated with a single clickstream pattern profile. However, because an individual may have multifaceted interests, he or she may alternatively be associated with multiple clickstream pattern profiles. The process of matching incoming clickstreams with existing pattern profiles can be as follows as illustrated in FIG. 5.

Figure 5:
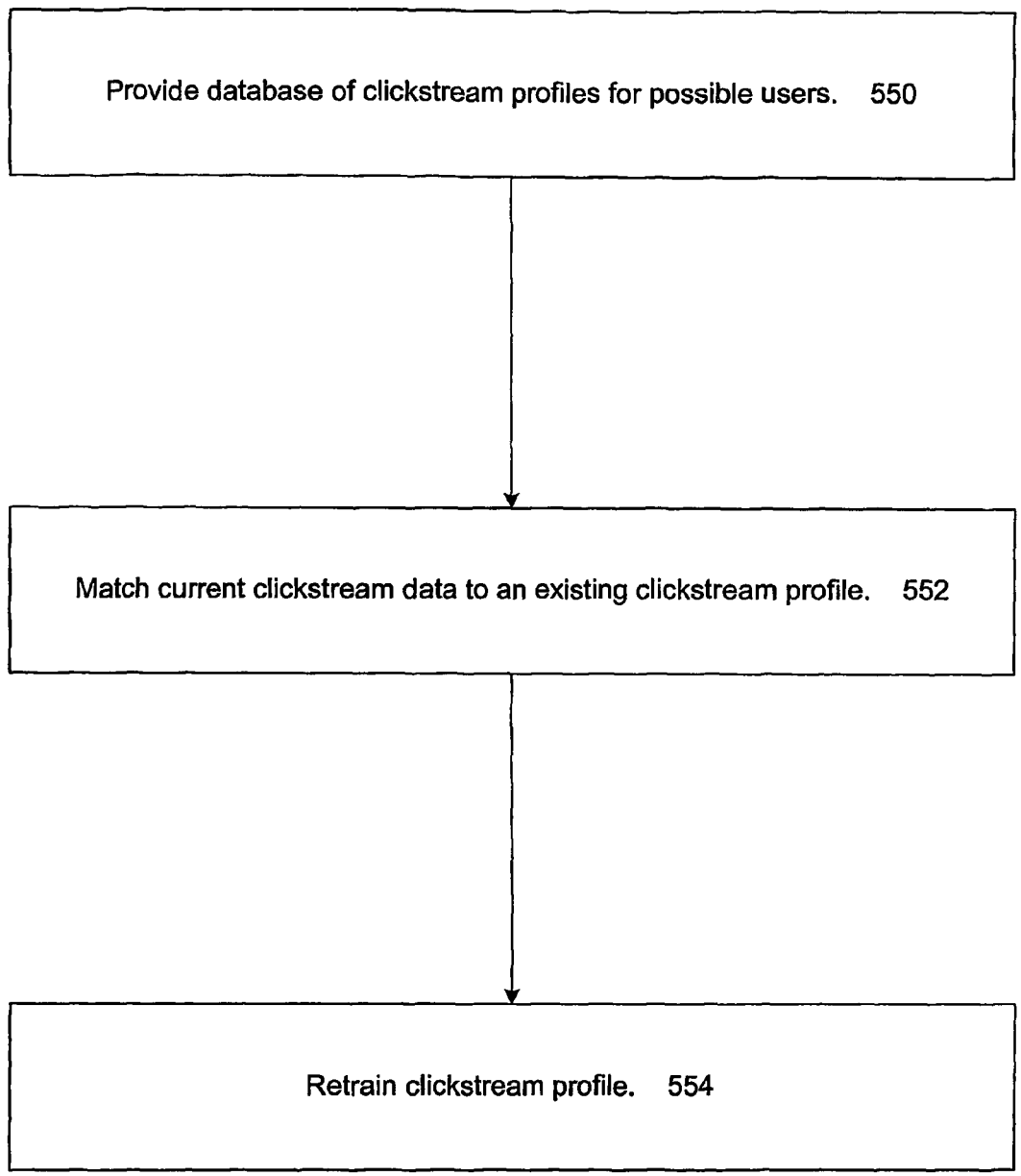
FIG. 5 is a flow diagram illustrating the algorithm for matching behavioral data with a stored user profile in accordance with the invention.

Referring to FIGS. 4 and 5, a set of recurrent clickstream profiles is created and stored in the user database 430 as indicated in step 550. It is expected that for a single client platform there will be multiple different observed clickstreams generated by usually a small set of individual users, each of whom may have several different strong areas of interest that manifest in their surfing behavior. These can be represented as a set of clickstream pattern profiles that summarize the content and surfing behavior of most or all the observed clickstreams.

A clustering algorithm, for example, can be used to generate a small set of clickstream pattern profiles to cover the space of observed clickstreams. New clickstream profiles can be added whenever a new (i.e., dissimilar to existing profiles) clickstream is observed. Old profiles can be deleted if no similar incoming clickstreams have been observed for a given period of time. The growth/pruning behavior of the algorithm can be moderated by a similarity threshold value that determines how precisely the profiles are desired to match incoming clickstreams, and thus how many profiles will tend to be generated.

The next step in the matching process is to dynamically (i.e., on-the-fly) match an incoming (i.e., current) clickstream to existing clickstream profiles as shown in step 552. As a user is generating a clickstream, the partial clickstream can be compared on-the-fly at generally any time with the existing set of stored clickstream profiles. A hard or soft match can be made in order to determine the identity of the current user.

Next, the stored clickstream profiles are preferably retrained with data from completed clickstream as indicated in step 554. Upon termination of the current clickstream, the set of clickstream profiles is preferably retrained to reflect the latest clickstream observation. Clickstream profiles can be adjusted according to their similarity to the current clickstream.

One type of input device statistic that is particularly efficient and useful for characterizing typing behavior is the "digraph" interval. This is the amount of time it takes a user to employ features of a remote control device. By tracking the average digraph interval for a small set of select digraphs, a profile of typical behavior can be constructed. The following are examples of various usage characterizing patterns for remote control devices. These include (1) the length of time a button on the remote control device is depressed to activate the button control; (2) the particular channels selected for viewing; (3) the digraphs for selecting multi-digit channels; (4) the frequency of use of particular control buttons such as the mute button; and (5) the frequency with which adjustments such as volume adjustments are made.

Figure 6:
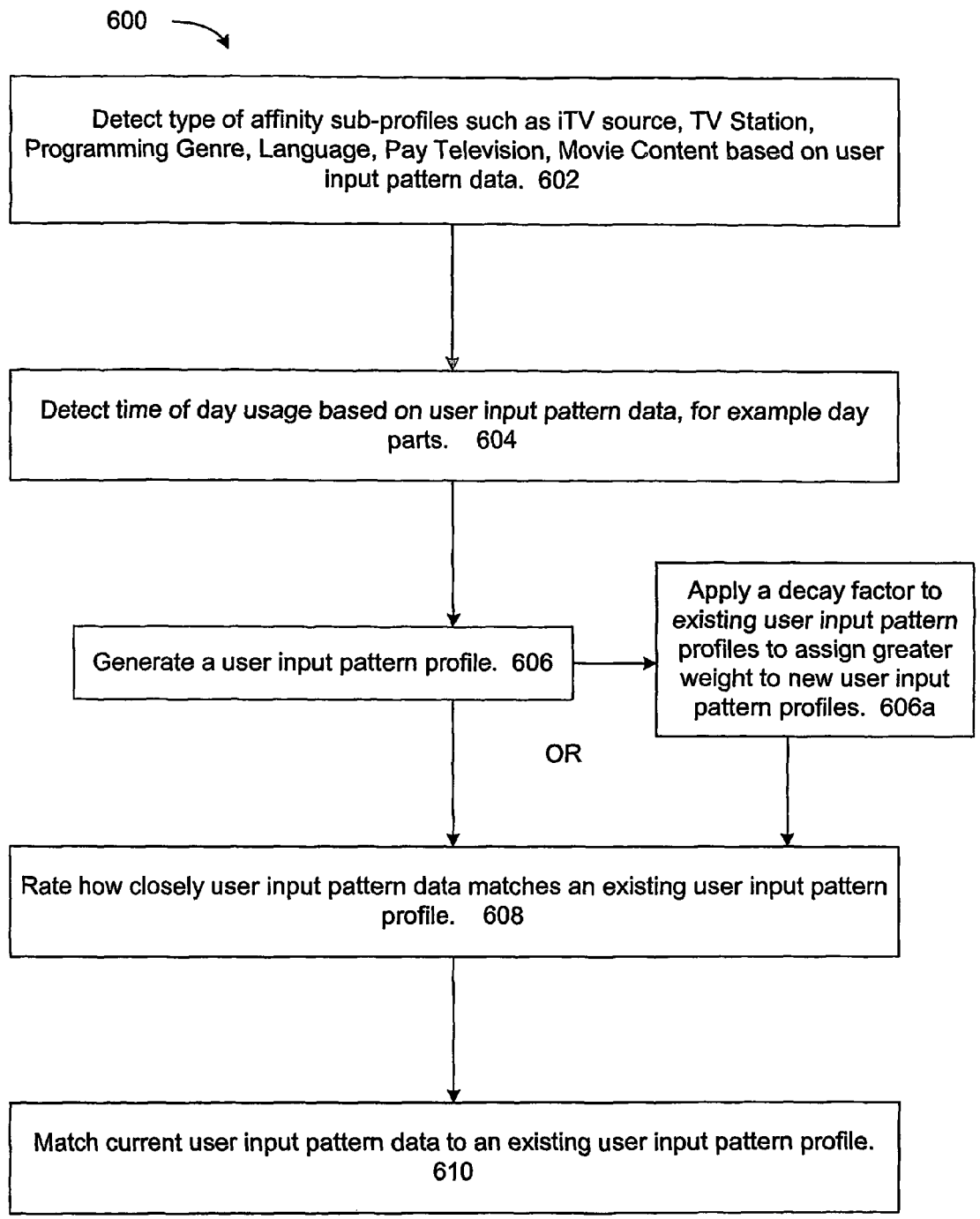
FIG. 6 is a flow diagram illustrating the affinity-day part algorithm in accordance with the invention.
Figure 7:
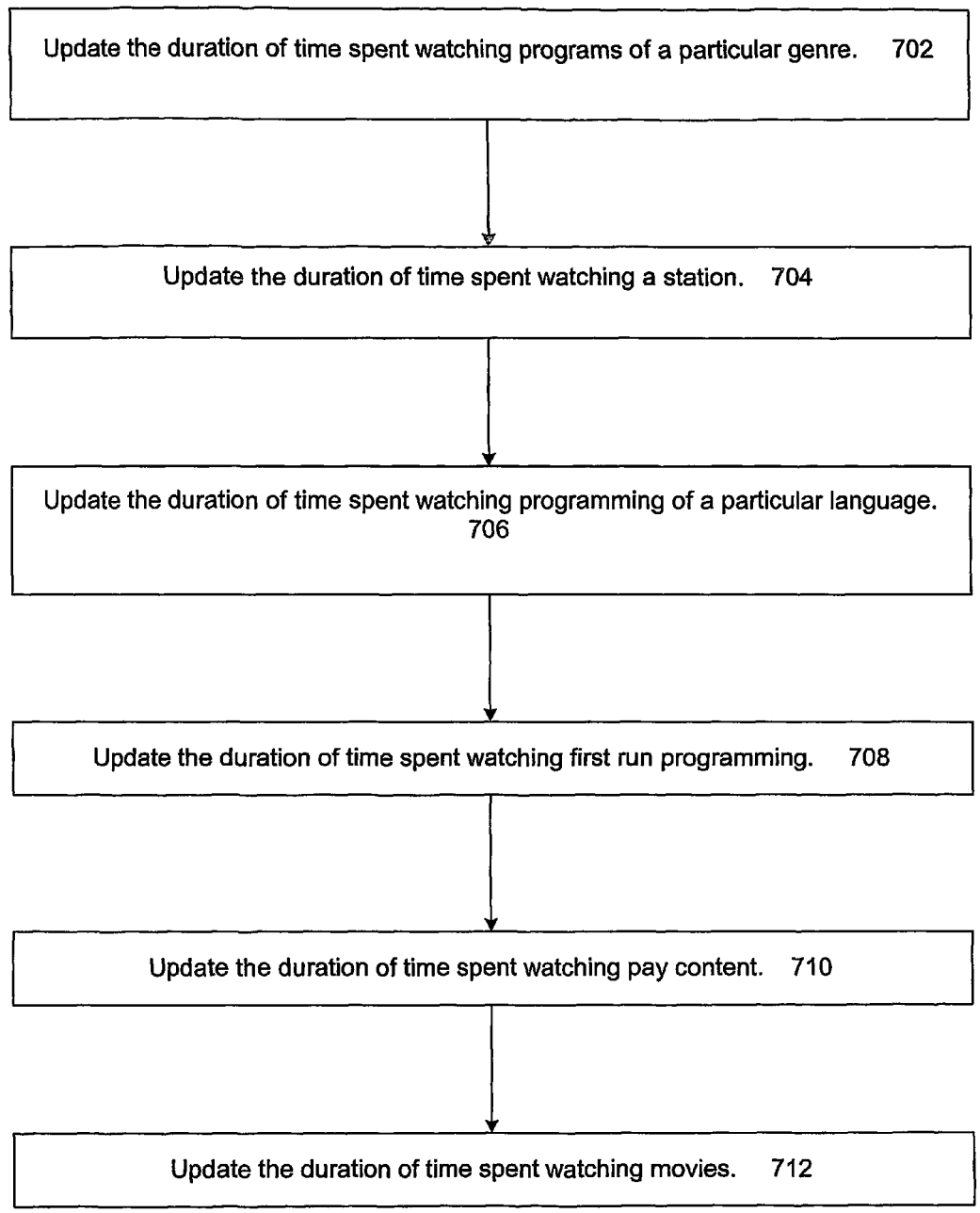
FIG. 7 is a flow diagram depicting the updating of the affinity-day part algorithm in accordance with the invention.

Affinity-Day Part Algorithm:

In another user profiling practice of the invention, illustrated in FIGS. 6 and 7, user profiles are generated by detecting a user's types of affinities and time of day input data. In this embodiment, a profile is a data structure, which can be the model of terminal device behavior, such as an STB, in which affinities are summed over time. In one implementation, multiple sub-profiles are broken down in two ways: type of affinity and time of day. The type of affinity can correspond to a television station, programming genre, language, pay television, or movies.

As shown in FIG. 6, an affinity-day part algorithm 600 comprises affinity sub-profiles and day parts. The affinity sub-profiles include, for example, iTV source, TV station, programming genre, language, pay content, or movie content and are detected based on user input pattern data as indicated in step 602. The time of day user input pattern data is inputted is also detected as shown in step 604. Based on the type of affinity sub-profiles and time of day user input pattern data, an input pattern profile is generated as indicated in step 606. In a further embodiment, a decay factor is applied to existing user input pattern profiles to assign greater weight to new user input pattern profiles as shown in step 606a. The system rates how closely user input pattern data matches an existing user input pattern profile as indicated in step 608 and matches current user input pattern data to an existing user input pattern profile as shown in step 610.

The movie affinity is separate from the programming genres. There is no movie genre in the programming genres. The time of day portion of the profile corresponds to different day parts. For each day part a user may have several (non-zero) genre affinities, station affinities, and language affinities. The user may have only one movie affinity and one pay television affinity. These numbers can represent the percentage of time the user watches programming of that type during the day part. The day parts used with genre affinities can be defined as follows:

1. Weekdays 6 a.m.-9 a.m.
2. Weekdays 9 a.m.-3 p.m.
3. Weekdays 3 p.m.-6 p.m.
4. Weekdays 6 p.m.-8 p.m.
5. Weekdays 8 p.m.-11 p.m.
6. Weekdays 11 p.m.-2 a.m.
7. Weekdays 2 a.m.-6 a.m.
8. Fridays 8 p.m.-11 p.m.
9. Fridays and Saturdays 11 p.m.-2 a.m.
10. Saturdays and Sundays 2 a.m.-6 a.m.
11. Saturdays 6 a.m.-12 noon.
12. Saturdays 12 noon-8 p.m.
13. Saturdays 8 p.m.-11 p.m.
14. Sundays 6 a.m.-12 noon
15. Sundays 12 noon-8 p.m.
16. Sundays 8 p.m.-11 p.m.

The day parts used with station affinities can be the same as the day parts used for genres with the exception that day part 5 (primetime weekdays) has been broken down into individual days to achieve greater accuracy in the recommendations.

17. Mondays 8 p.m.-11 p.m.
18. Tuesdays 8 p.m.-11 p.m.
19. Wednesdays 8 p.m.-11 p.m.
20. Thursdays 8 p.m.-11 p.m.

The numbering scheme reflects how the day parts can be numbered in the database. Day parts 1-16 can be used with genre affinities and day parts 1-4, 6-20 can be used with station affinities. For both sets of affinities there can also be an additional sub-profile to which all events are added representing the average behavior of the STB over all time periods. This is the average profile or average day part and is represented by the number 0 in the database. This average sub-profile is used for rating items when enough information isn't available within a specific day part.

A viewing event for a channel causes the duration to be added to the particular channel's sum in the day part and the overall sum in the day part. The same is then repeated in the average day part. There is a minimum duration for a viewing event to cause the profile to be updated. In one practice, viewing events greater than 10 seconds are considered. This filters out tuning events caused by channel surfing. The viewing event may only affect the sums for the given channel. The information for the genres is handled similarly, except that the possibility exists for an item to have multiple genres. Shows with compound genre, i.e. RealityAdventureDrama, are split into single genres. Data supplied by Tribune Media Service (TMS), a television program guide data supplier, can order the genres listed for a program so that the first genre listed is the most relevant to the program, the second genre listed is second most relevant and so on. This information can be used to attribute the viewing time in a weighted fashion that is proportional to the order in which the genres are listed. Since it is unclear how much more the first genre should be weighted compared to the second and so on, a fairly conservative method is employed to easily maintain normalization of the categories. The formula for distributing the viewing time of a program among the various genres of the program is as follows: (# of genres for the program—the index of the current genre+1)/(sum of the index for all the genres of the program) where the index of each genre reflects the order in which it was listed. So if the RealityAdventureDrama show was watched for 30 minutes, instead of crediting the 30 minutes to one genre or crediting 30 minutes to each genre or even crediting 10 minutes to each genre, the household is credited proportionally for each of the individual categories.

In this example, there are 3 genres for the program, the index for each genre reflects the order in which it is listed (Reality—index 1, Adventure—index 2, Drama—index 3), and the sum of the indexes is 6. Therefore the 30 minutes of viewing time will be distributed among the three genres in the following way: Reality–weighting=(3−1 +1)/6=0.5, 0.5 * 30=15 minutes, Adventure–weighting=0.33, 0.33 * 30=10 minutes, and Drama–weighting=0.16, 0.16 * 30=5 minutes.

Referring to FIG. 7, a flow diagram depicting updating affinity sub-profiles, the duration of time spent watching programs of a particular genre, as indicated in step 702, comprises:

Duration(Genre $i$, User $j$, Day Part $k$)=Duration(Genre $i$, User $j$, Day Part $k$)+((#genres for current program−index of current genre+1)/(sum of index for all genres of current program)) * viewing duration of current program.

Updating the duration of time spent watching a station, as shown in step 704, can be more directly calculated since a user may only watch one station at a time. For example, the duration of time spent watching a station, shown in 704, can comprise:

Duration(Station $i$, User $j$, Day Part $k$)=Duration(Station $i$, User $j$, Day Part $k$)+viewing duration of current program, where current program was viewed on station $i$ during day part $k$.

The genre sum can be kept separate from the channel sum so that items without one type of information will not dilute the information for the other (i.e. shows without genres will not dilute the ratings of all genres). As with channels, the genres' average day part sub-profile is updated the same way as the specific day part sub-profile.

The user's language profile is used to act as a filter that allows us to only recommend programs in a language that the user is familiar with. The language of a program can be determined by checking the "ProgramLanguage" field in the Program table. Referring again to FIG. 7, updating the duration of time spent watching programming of a particular language, as indicated in step 706, is similar to the duration update for stations described above and comprises:

>  Duration(Language $i$, User $j$, Day Part $k$)=Duration
> (Language $i$, User $j$, Day Part $k$)+viewing duration
> of current program, where current program was
> viewed in language $i$ during day part $k$.

In this example, there are separate from genre, station, and language, three other affinities that typically don't have sub-categories: first run, pay, and movie. The "First Run" affinity is created to act as a filter that allows us to not recommend re-runs to users who don't like to watch re-runs. For each program that is watched, it can be determined if it is a re-run by checking the "Repeat" field in the Schedule table. Alternatively, the "Original Air Date" field in the Program Table can be checked to determine if it is earlier than the current airdate.

Step 708 of FIG. 7 depicts updating the duration of time spent watching first run programming, similar to the duration update for stations described above and can be stated as:

> Duration(First Run, User $j$, Day Part $k$)=Duration
> (First Run, User $j$, Day Part $k$)+viewing duration
> of current program, where the current program is
> not a repeat.

The "Pay" affinity is created to act as a filter to help us determine which users might be interested in receiving recommendations for pay content such as PPV or VOD. Over time this category will reflect PPV movies as well as VOD. To determine that a channel is PPV, the "servicetier" field can be selected in the Channel table. A value of 4 can denote PPV.

As shown in step 710 of FIG. 7, updating the duration of time spent watching pay content is similar to the duration update for stations described above and comprises:

> Duration(Pay, User $j$, Day Part $k$)=Duration(Pay, User
> $j$, Day Part $k$)+viewing duration of current program, where the current program is pay content.

The "Movie" affinity is different from the genre affinities in order to create separate user profiles for movies. Additionally, the movie affinity differs from the movie profile, which will be discussed in detail below. The movie affinity measures the user's interest in watching movies during a given day part. The movie profile contains detailed information into what types of movies the user likes to watch. The movie profile has been separated out from the other profiles to improve the quality of making movie recommendations, particularly for VOD and PPV. When the user's movie affinity score is above threshold for a given day part, then the user's movie profile will be used to recommend movies. In order to determine if a program is a movie, the "Program Type" field in the Program table can be used. Typically, all programs of program type "MV" are movies. In order to track feature films instead of made for TV movies, the program type "MV" can be used where the field "MadeForTV" in the Program table is equal to 'N'.

Referring to step 712 of FIG. 7, updating the duration of time spent watching movies is similar to the duration update for stations described above and comprises:

> Duration(Movie, User $j$, Day Part $k$)=Duration(Movie,
> User $j$, Day Part $k$)+viewing duration of current
> program, where the current program is a movie
> and is not "MadeForTV".

Referring again to FIG. 6, in one embodiment a profile can be aged so that after a certain period the existing profile will be begin to decay and the new data will have greater weight, as indicated in step 606*a*. As a result, two ways of generating genre and station scores can be employed. For the first part of the profiling (before decay begins) the scores are generated much in the same manner as in previous implementations. The scores are based on the duration spent on a category divided by the total duration. Examples of this for Genre and Station comprise the following:

> Score(Station $i$, User $j$, Day Part $k$=Duration(Station $i$,
> User $j$, Day Part $k$)/Total Viewing Duration for
> Day Part $k$ > Score(Genre $i$, User $j$, Day Part $k$)=Duration(Genre $i$,
> User $j$, Day Part $k$)/Sum across all Genres: Duration(Genre $i$, User $j$, Day Part $k$), where Duration
> (Genre ($i$), User $j$, Day Part $k$) is defined as
> above.

> Score(Language $i$, User $j$, Day Part $k$)=Duration(Language $i$, User $j$, Day Part $k$)/Total Viewing Duration for Day Part $k$ > Score(First Run, User $j$, Day Part $k$)=Duration(First
> Run, User $j$, Day Part $k$)/Total Viewing Duration
> for Day Part $k$ > Score(Pay, User $j$, Day Part $k$)=Duration(Pay, User $j$,
> Day Part $k$)/Total Viewing Duration for Day Part
> $k$ > Score(Movie, User $j$, Day Part $k$)=Duration(Movie,
> User $j$, Day Part $k$)/Total Viewing Duration for
> Day Part $k$ The scores can be calculated in this way for the first 20 hours of television viewing witin each day part (except for day part 0, the average profile, which will be calculated this way for the first 120 hours of television viewing). After which the day part profiles will begin to decay. The profiles that may decay are the Genre profile and the station profile. Language, First Run, Pay, and Movie affinities do not decay. The values of 20 and 120 are parameters that may be selectively changed. The scores during the decay period (after the 20 hour limit has been reached) are:

> Score(Genre $i$, User $j$, Day Part $k$)=(1 −df*Wg)*Score
> (Genre $i$, User $j$, Day Part $k$)+df*Wg and for all $n$
> not equal to $i$, > Score(Genre $n$, User $j$, Day Part $k$)=(1−df*Wg)*Score
> (Genre $n$, User $j$, Day Part $k$)

These two steps will result in normalized Genre Scores, i.e. The total of all genre scores will always be 1 for each day part. The parameter df is a decay factor that is currently given a value of 0.4 but may be modified after testing. In general, the df value for the average day part (day part 0) will probably be different than the df value for the other day parts. The weighting factor Wg=(viewing duration of current program attributed to Genre k/program duration), where viewing duration attributed to genre k is determined as described in the previous section. Similarly for stations:

> Score(Station $i$, User $j$, Day Part $k$)=(1−df Ws*) Score
> (Station $i$, User $j$, Day Part $k$)+df*Ws and for all
> $n$ not equal to $i$, Score(Station $n$, User $j$, Day Part $k$)=(1 −df*Ws)* Score(Station $n$, User $j$, Day Part $k$) where Ws= (viewing duration of current program/program duration). The values of df are the same as in the genre equations.

In implementing the affinity-day part algorithm 600, it is not necessary to update the total hours of viewing after the 20 hour limit has been reached. However, information regarding the actual total hours of viewing can be kept. If the program duration information needed in calculating the weighting factors (Wg and Ws) is difficult to obtain, the viewing ratio can be replaced by different values for events <10 minutes, <20 minutes, <30 minutes, etc. with the value being 1 after a certain number of minutes.

The profiling methods described above when combined with the rating system described below produces accurate recommendations for programs on stations that the user has watched before. Users habits can be expanded by recommending: (1) programs on stations the user has never watched; (2) programs, particularly movies, to the user that occur on pay channels (PPV or VOD); or (3) subscription channels to which the user is not currently subscribed. This can be accomplished by using clustering methods described in the ratings section below in order to recommend programs on stations that the user has never viewed but that are similar to the user's preferred stations. Additionally, with the advent of VOD and PPV, there will be a wide array of movies available to users that aren't associated with any particular station.

As shown in step 606 of FIG. 6, a user input pattern profile relating to, for example, movie content must be generated in order to rate movies unrelated to stations is the creation of a movie profile. The movie profile is similar to the Station and Genre profiles created above to the extent the same day parts are used. The movie profile can consist of the following categories: Era, Distributor, Genre, and Star-rating.

For example, there are eight movie eras: the silent era (pre-1927), the pre-WVII era (1927-1940), the golden era (1941-1954), the transition era (1955-1966), the silver era (1967-1979), the modem era (1980-1995), and the post-modern era (1996-present). The era of a film can be determined by selecting the "ReleaseYear" field from the Program table. In cases where the release year field is 'NULL', the movie has not been released and should be treated as a regular program and not as a movie.

Many movie distributors exist, but only about a dozen major ones. The distributor can be determined by selecting the "DistributingCompany" field from the Program table. Some of the movies in the TMS database do not have a distributor listed. However, when there is a distributor listed it is a useful piece of data that will be used when it is available. For example, most films available on PPV and VOD have distributors, therefore tracking this data will become more relevant as PPV and VOD content is recommend.

The Genre categories are the same as the genres used in the regular profile. As in the previous genre profiles, the genre can be retrieved from a program genre table. The star rating measures the quality of the movie and can be retrieved from the "StarRating" field of the Program table. The star rating is stored as a varchar and is converted to a float.

The genre scores in the movie profile will be generated in the same way as the genre scores described above with the exception that instead of viewing events having to, be greater than 5 minutes in length for the score to be updated the viewing events have to be greater than 5 minutes in length in the case of the Movie profile. This is true for all of the categories that comprise the Movie profile. These may not be updated unless the viewing event is greater than 20 minutes. Updating the genre scores in the movie profile comprises:

Score(Genre $i$, User $j$, Day Part $k$)=Duration(Genre $i$, User $j$, Day Part $k$)/Sum across all Genres: Duration(Genre $i$, User $j$, Day Part $k$), where Duration (Genre $i$, User $j$, Day Part $k$) is defined as above.

The star rating score that accompanies each genre score will be the average star rating for all movies of that genre can be stated as:

Score(Star Rating Genre $i$, User $j$, Day Part $k$)=Sum (Star Rating Genre $i$, User $j$, Day Part $k$)/Sum (# of Movies of Genre $i$, User $j$, Day Part $k$)

The distributor score will be the time spent viewing movies of a given distributor divided by the total time spent viewing movies for a given day part. The scores for eras are also calculated similarly and comprise:

Score(Distributor $i$, User $j$, Day Part $k$)=Duration(Distributor $i$, User $j$, Day Part $k$)/Total Movie Viewing Duration for Day Part $k$ Score(Era $i$, User $j$, Day Part $k$)=Duration(Era $i$, User $j$, Day Part $k$)/Total Movie Viewing Duration for Day Part $k$ In a further practice, the minimum viewing time for an event to be added to the profile is set to 1 second (i.e. no cutoff), employable with the code. Additionally, station IDs are linked to channel affinities so that if there is a change to the channel lineup the user will still get the correct recommendations. If the system does not have direct access to the station IDs on the set top box then, the channel information is combined with unique keys. Additionally, genre durations can be weighted when being recorded to the profile in the order they appear in the data listings.

As shown in step 608 of FIG. 6, rating an item determines how closely that item matches the profile and assigns a numerical value representing that degree of closeness. Typically, the values do not carry units and are meaningful in relation to the values of other items. Higher values mean a closer (i.e. "better") match. The total rating of an item is calculated based on the determined match score for its channel and genres.

Before ratings are generated there are several factors that filter out programming that is either inappropriate to recommend or of no interest to the user. In one practice, programs of the genre "Adults Only" can be given a rating of 0 and will not be recommended. If the program is an R-rated movie and it airs before 8 p.m., it can be given a rating of 0. The rating of a movie can be found by using the MPAARating field in the Program table. If the program is "paid programming" then it can be given a rating of 0. This can be determined from the "ShowType" field in the Program table. If the programming language does not match one of the languages for which the user has a language affinity above threshold (0.05) then the program can be given a rating of 0. If the "First Run" affinity of the user for a given day part is above the first run threshold (0.6), then all repeats in the given day part will be given a rating of 0. If the "Pay" affinity of the user for a given day part is less than the pay threshold (0.4) then all pay events in the given day part will be given a rating of 0. If the program occurs on a premium channel and the user's score for that station is zero, then the program will be given a rating of 0.

In general, the rating for a program for a particular user or household can be determined by multiplying the Genre score and Station score in the user profile that matches the genre and station of the program for the appropriate day part. The ratings are calculated in a five-stage process. During the movie stage, ratings are generated for movies that might not be showing on stations the user normally watches. During the favorite programs, stage the program must match both the station affinity and genre affinity of the user for the current day part. In the favorite stations stage, the station scores from the current day part can be used to generate ratings. In the behavior expanding stage, a clustering algorithm can be used to recommend non-movie programs occurring on stations the user doesn't usually watch. In the fill-in stage, the station scores from the average profile can be used to generate ratings. Constants are added at various stages to ensure that the ratings reflect the relevance of the programming. At each stage a boosting factor is introduced for shows (non-movies) that are premieres or finales. This can be determined by checking the "premierfinale" field in the Program table. Programs that are premieres or finales have their ratings boosted by adding 0.2to their rating if they already have a non-zero rating. Premieres or finales for programs that don't match the user's interests are not boosted.

When a program has multiple genres, the genres can be treated as a series of individual genres ("Action", "Adventure", "Comedy") or they can be treated as a compound genre ("ActionAdventureComedy") or as a combination of both ("Action", "Adventure", "Comedy", "ActionAdventureComedy"). For simplicity and to conserve on space, each of the genres is treated individually. So the first genre listed is generally the one that best describes the show and the second genre listed is second best, etc. To account for this an index for the genres can be created that correspond to the position in the listing. This index can be used to weight how much that genre will contribute to the program rating. The genre score then contributes to the program rating in the following way:

Genre portion of program rating=(Program Genre Score $k$)×(User Genre Score $k$) for all $k$ where Program Genre Score $k$=(# genres for current program-index of current genre+1)/(sum of index for all genres of current program) and User Score $k$ is >threshold and Genre $k$ is a genre of the current program.

Station portion of programming rating=(User Station Score $k$), for all $k$ where User Station Score $k$ is >threshold and Station $k$ is a station of the current program. The current threshold value for both station and genre scores is 0.05.

So for the favorite programs stage the rating is:
Program rating=2+(Genre portion ×¼)+(Station portion ×¾) where the portions are calculated using the day part profile of the user that corresponds to the day part during which the current program airs. This first stage is designed to recommend shows that users watch most frequently. This stage applies to all non-movie programming. If a program is a movie and the user has a movie affinity that is above threshold then it is rated in the next stage.

The movie stage can take place if the user has a Movie affinity in the current day part that is above threshold. This stage allows us to make recommendations for movies on stations the user doesn't normally watch. In this case, the user's movie profile can be used for the day part in question. The rating is generated from the distributor, era, and genre scores and the star scores are used as filters. The station scores from the regular profile are used as boosting mechanisms.

The star filter works in the following manner. A movie will not be recommended if it contains a star rating that is more than half a star below the user's rating score for the genre of the film.

Program rating=1+(((Genre portion)+(Era score)+ (Distributor score))/3), where the Genre portion is calculated in the same way as the Genre portion for non-movie programming described above.

If the movie is occurring on a station that the user has an above threshold score for the current day part then adding 1 to it boosts the program rating. This will put the program rating on par with the program ratings generated in the favorite programs stage.

In the favorite stations stage of the process, programs that did not receive a rating during the first stage are given a rating if the program station matches a station for which the user has a score above threshold in their day part profile.

program rating =1+ Station portion where Station portion is calculated using the day part profile of the user that corresponds to the day part of the program being rated. The value of 1 is included in the equation to insure that the ratings generated in this stage are always higher than the ratings generated in the final stage. This stage is designed to recommend programs on the users favorites stations for a given day part. The programs may or may not have been viewed previously by the user.

The behavior expanding stage uses clustering to recommend non-movie programs on stations the user has never watched. All of the stations are clustered based on the type of content available on the stations across a month's worth of TMS data. The clusters are further refined using a group of TV experts to ensure the quality of the clusters. Ratings are generated based on the user's station scores for the current day part. Any non-network station scores above the cluster threshold of 0.1 will be used to generate ratings for new stations in the same cluster. The station with a score above 0.1 is referred to as an "Ideal Station" in the equations. Since there are often many stations within each cluster, there may be many programs to choose from. In order to maintain a careful balance between new and old shows, one program can be chosen from a given cluster to recommend. The program will be chosen among stations that have user score below threshold (0.05) for the day part, i.e. The station has rarely been viewed by the user during this day part. This part of the process uses feedback. The first time this behavior expanding rating process occurs, stations that the user has never or rarely watched before are selected based on the genre score for the program. Each time a new station is recommended, a record is kept that it has been chosen. The next time the system is in this stage of the ratings, only stations that have never been viewed (station score below threshold) and which have not been previously recommended more than the limit (currently set at 5) are chosen. Out of these available stations, the program with the highest genre score is chosen. If there is a tie, the program is selected at random. By using a station score threshold that is above zero and a limited number of recommendations greater than 1, this builds up the rating for a new station to the point where recommendations will be generated on the basis of being a regularly watched program rather than a station that has never been watched. In this manner, behavior can be influenced and stations moved from "never been watched" to "regularly viewed". The rating for the program is generated using the genre score for the program and the station score of the ideal station.

Program rating=1+(Genre portion×¼)+(Ideal Station portion×¾) where the portions are calculated using the day part profile of the user that corresponds to the day part during which the current program airs and the Ideal Station portion >0.2 and the Station of the chosen program has a Station score below threshold and has not been recommended more than the limit.

In the fill-in stage of the process, programs that did not receive a rating during the first two stages are given a rating if the program station matches a station for which the user has a score above threshold in their average profile (day part 0). Program rating=Station portion, where Station portion is calculated using the day part 0 profile of the user.

This final stage recommends program on the user's favorite stations across all day parts. The programs may or may not have been viewed previously by the user. If after all of this there are still not enough ratings, the ranker will address the issue either by filling the remaining slots with the remaining channels listed in numerical order.

Once user profiles and ratings are generated by, for example, the behavioral data or affinity-day part algorithms described above, the present invention generates a user perceptible indicator of content at a change in system state.

Notification of Recommended Content:

FIG. 4 illustrates an embodiment of a content notification and delivery system in accordance with the present invention. In an interactive program guide (IPG) 422 like that shown in FIG. 4, the recommendation engine 426 can monitor incoming content or programming and rate each program or content available for viewing, using the methods described above or known methods described in the U.S. and foreign patent documents incorporated herein by reference. The recommendation engine 426 employs user profile information made available by the profile engine 424 and maintained in a user database 430 to generate ratings and recommendations. An indicator engine 428 uses the recommendation information made available by the recommendation engine 426 to generate a user perceptible indicator of recommended content via an interactive process 429.

In accordance with the present invention, the user perceptible indicator comprises a visual or an aural indication of recommended content. In another practice, the user perceptible indicator is provided at a change in system state such as activating client platform 414 (e.g., an STB) or a display device 418, such as a television or video monitor. In another embodiment, an interface can be provided by which the user can consent to have indicators appear over existing programming. Upon receipt of the user perceptible indicator, the user can employ a user interaction device 420, for example a remote control device, to interact with the user perceptible indicator and either select the recommended content or continue viewing the previously shown content.

By way of example, the user perceptible indicator can contain the following prompt: "Show X is now on Channel Y. Would you like to change the channel? Yes/No". If the user responds by selecting "Yes" the channel will change automatically. If the user selects "No", the indicator is dismissed and the channel is tuned to the channel number that the user was originally tuned to. If the user does nothing the indicator is removed after a pre-determined time period elapses, and the STB tunes to the channel the user had previously entered.

While the above description refers to client platforms and/or STB devices, other commercially available devices and STBs can be modified with the software, databases, and hardware used for affecting the system of the present invention.

Figure 8:
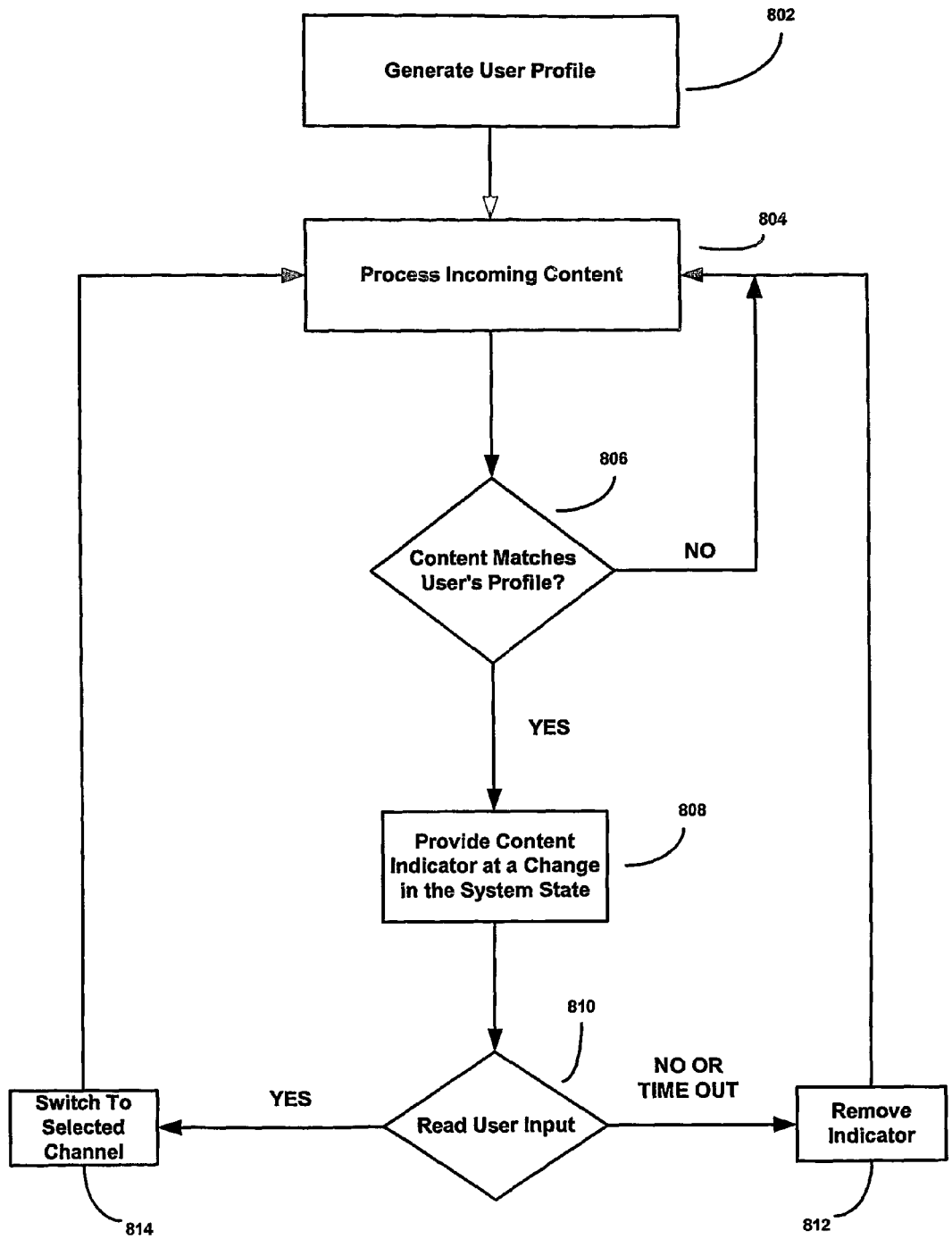
FIG. 8 is a flow diagram of another content notification and delivery method in accordance with the invention.

Referring to FIG. 8, a further practice of the present invention is illustrated wherein user profiles are generated as indicated at step 802 employing methods described above as well as those examples set forth in the U.S. and foreign patent documents listed above, the teachings of which are incorporated by reference. Incoming content is processed as shown at step 804, such that video content and other associated information can be analyzed as depicted at step 806 for similarities with the user profile information stored in a user database. If there are no similar user profiles, the search continues, returning to step 804.

If content is similar to user profile information, an indicator is provided on the display device or television, as indicated at step 808. In one practice the indicator is provided at a change in system state such as activating the television Of STB. In another aspect, the indicator is provided when a channel change event occurs during the time period before the STB tunes to a channel. In a further embodiment, notification of recommended content is provided as an on-screen display, such as a pop-up window, alerting the user of a program on the screen and requesting the user to decide whether she wants to change channels to view the content. Such a visual indicator can be combined with, or replaced by an audio indicator, in order to aurally alert the user of an upcoming program.

The system then waits a predetermined time for user input, as shown at step 810. If the user selects "No", evidencing no change to the recommended content, or the predetermined time elapses without a selection, the indicator is removed as depicted at step 812 and the system can return to step 804. If the user selects "Yes", a channel change is made as indicated at step 814 and the system can return to step 804.

Figure 9:
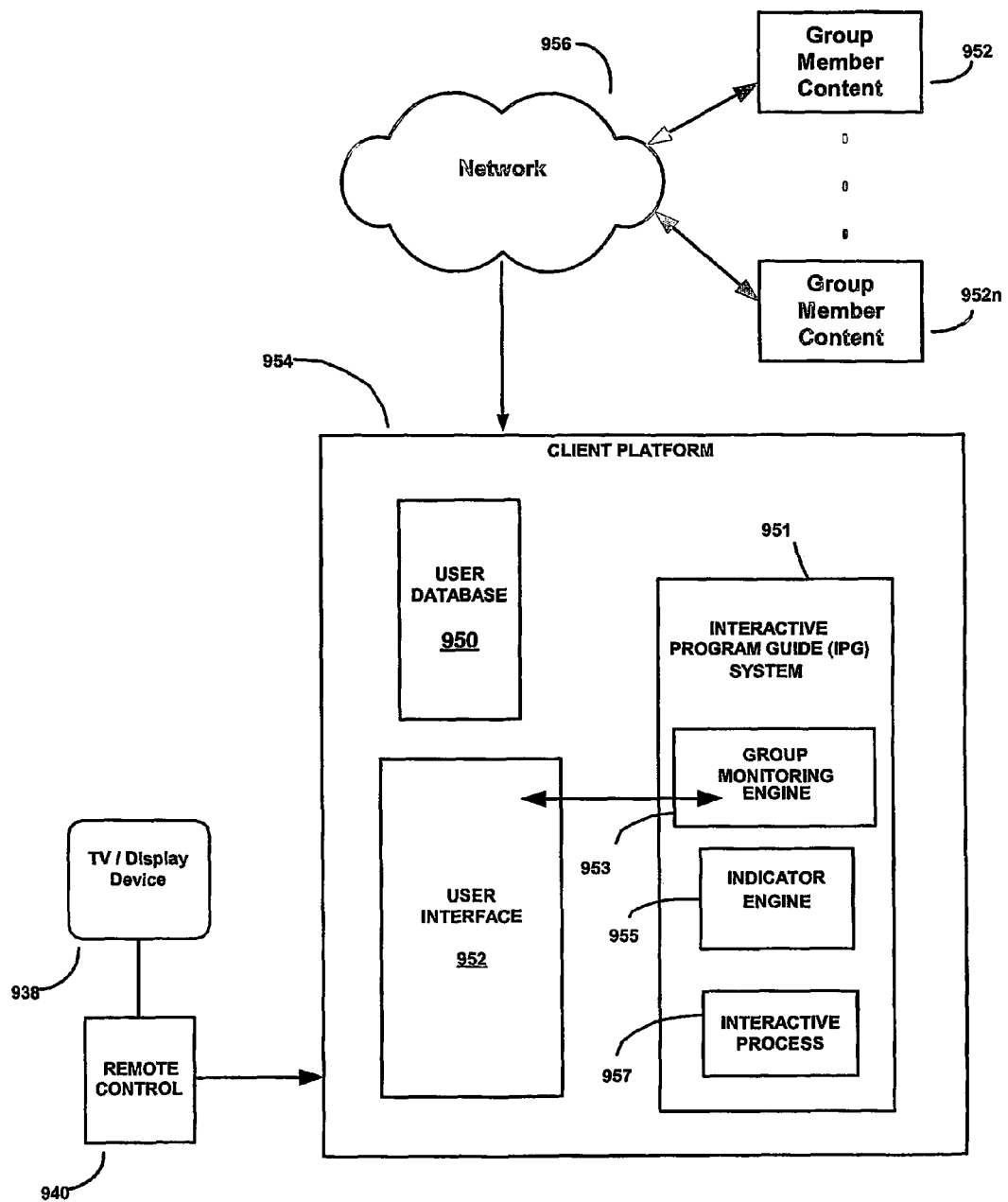
FIG. 9 illustrates a content delivery system in accordance with the invention.

Notification of Content being Viewed by User Group Members:

Referring to FIG. 9, another embodiment in accordance with the present invention is shown. In this practice, the user can create a group of users whose content or programming the user is interested in being notified of by a user perceptible indicator. The user can employ a user interaction device 940, for example a remote control, to interact with a user interface 952 to input a user group member's name and the member's unique identifier, such as a STB identification number or a MSO identification number. The group identification information can comprise identifiers belonging to users either within the same MSO or part of a different MSO employing the methods and systems of the present invention. The group identification information is stored in a user database 950.

In an interactive program guide (IPG) 951 like that shown in FIG. 5, a group monitoring engine 953 monitors user group member content 952, for example television programming, currently being viewed by the user group members. In one embodiment shown at 952*n*, "n" can represent an infinite number of group members. The group monitoring engine 953 determines whether a plurality, for example a pre-determined number of group members, are viewing a particular content item or program. If a plurality of the user's group members is viewing the same program, an indicator engine 955 generates an indicator via an interactive process 957 based on the group information available from the group monitoring engine 953. Exemplary interactive processes can include pop-up windows.

Receipt of the user perceptible indicator prompts a user to decide whether to switch to the program the group members are viewing. The user can interact with the user perceptible indicator by using an interaction device 940 such as a remote control device to either select the group content or continue viewing the previously shown content. In accordance with the present invention, the user perceptible indicator can comprise a visual or an aural indication of recommended content. In another practice, the indicator can be provided at a change in system state, such as activating client platforms 954 (for example, an STB) or a television display device 958 (for example, television display). In another embodiment, the user can employ user interface 952 and interaction device 940 to consent to receiving user perceptible indicators pop-up over existing programming.

For example, users can obtain their STB identification number through their MSO graphical user interface (GUI) and exchange the STB identification number with friends.

The user and her friends then input the STB information via the user interface 952. Group monitoring engine 953 monitors the content or programs being viewed by the user group members. Whenever a plurality of the user's friends is watching the same program, an indicator is generated via the interactive process 957 to prompt the user to decide whether to switch to the program her friends are watching.

Figure 10:
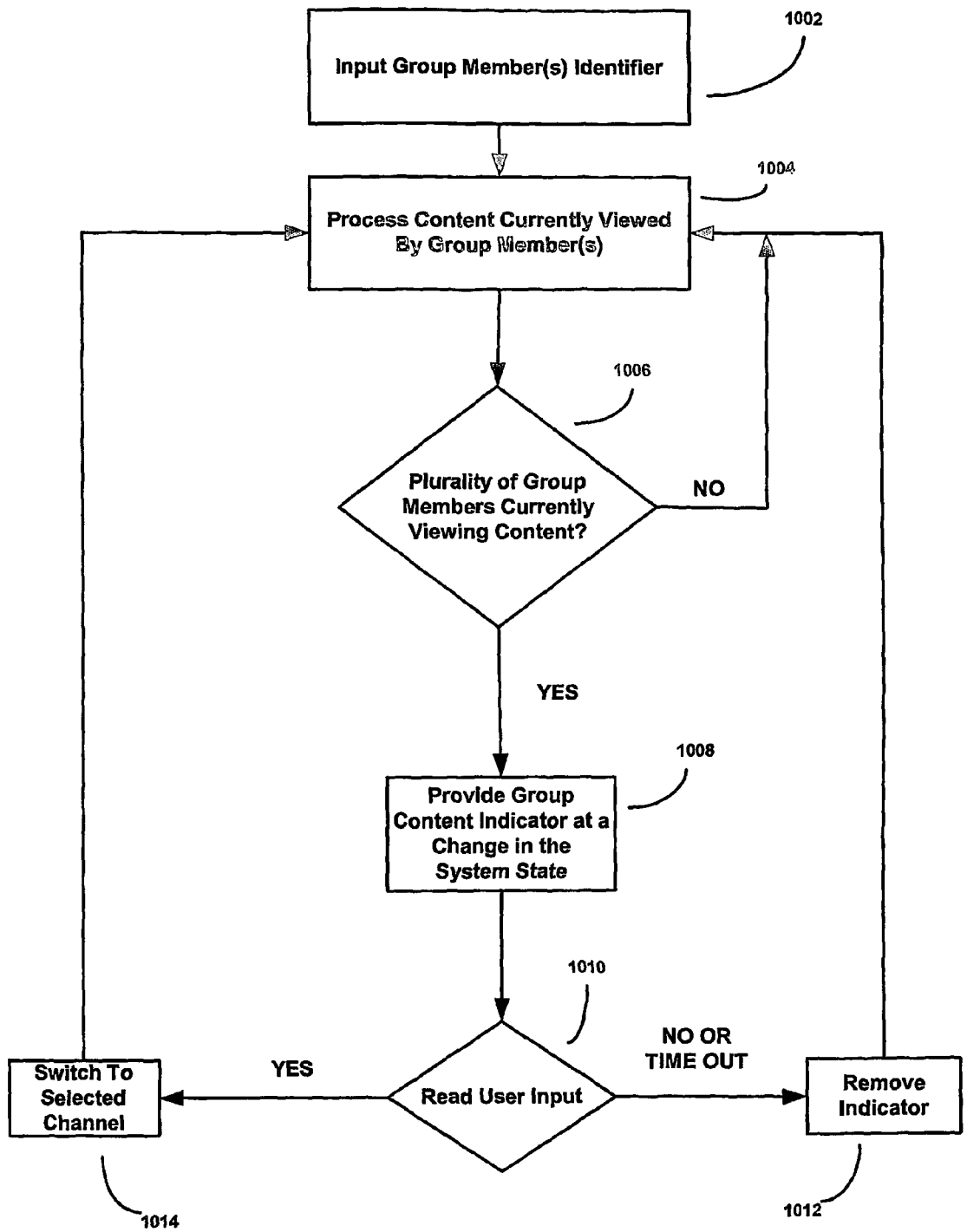
FIG. 10 is a flow diagram of another content notification and delivery method in accordance with the invention.

In another practice of the invention depicted in FIG. 10, the system can receive group member identification information inputted by a user as indicated at step 1002. The system processes content being viewed by the user group members to determine whether the same programming is viewed by the members, as depicted at step 1004. The present invention determines whether a plurality of user group members are watching the same program in excess of a pre-determined threshold, as indicated at step 1006. If no plurality of group members are viewing the same content, the system continues its processing, returning to step 1004.

If a plurality of user group members are watching the same program, a user perceptible indicator is provided to the user group members on a display device or television, at shown at step 1008. In one practice, the indicator is provided at a change in system state such as activating a television or STB. In another aspect, the indicator is provided when a channel change event occurs during the time period before the STB tunes to a channel. In one embodiment, a user perceptible indicator is provided as an on-screen display such as a pop-up window, alerting the user of a program being viewed by a plurality of user group members and prompting the user to decide if she wants to change channels to view the recommended program. In another embodiment, a visual indicator can be combined with, or replaced by an audio indicator, in order to aurally alert the user of an upcoming program.

The system then waits a predetermined time for user input, as shown at step 1010. If the user selects "No", evidencing no change to the recommended program, or the predetermined time elapses without a selection, the indicator is removed at depicted step 1012 and the system can return to step 1004. If the user selects "Yes", a channel change is made as indicated at step 1014 and the system can return to step 1004.

The foregoing embodiments and practices are described solely by way example, and are not intended to limit the scope of the invention. Those skilled in the art will appreciate that numerous variations and modifications of the foregoing examples are possible and within the scope of the invention, which is limited solely by the appended claims.

We claim:

1. A method of displaying content recommendations to a user, the method comprising:
   monitoring, by a client device of a user, content viewed on a content viewing device by a user;
   generating a profile, at the client device of the user, based on multiple sub-profiles that each include a type of affinity and time of day;
   processing, at the client device of the user, incoming content to the content viewing device to identify television shows available for recommendation;
   viewing one of the available television shows on the content viewing device;
   comparing, at the client device of the user, each of the other available television shows to the generated profile;
   rating, at the client device of the user, each of the other available television shows based on the comparison of each of the other available television shows to the generated profile;
   determining, by a content recommendation engine at the client device of the user, a content recommendation based on the ratings of each of the other available television shows;
   detecting, while viewing the television show, when a system state change representing a user-initiated content viewing selection change is requested to no longer view the television show;
   in response to detecting when a system state change representing a user-initiated content viewing selection change is requested to no longer view the television show, providing, from the client device of the user to the content viewing device of the user, while viewing the television show and prior to implementing the system state change representing a user-initiated content viewing selection change to no longer view the television show, a perceptible indicator of a content recommendation on the content viewing device of the user including a visual or an audible indication that prompts the user with a selection for deciding whether to view the content recommendation;
   interrupting the viewing of the television show without implementing the system state change representing a user-initiated content viewing selection change by switching to the content recommendation when the user selects to view the content recommendation; and
   interrupting the viewing of the television show by implementing the system state change representing a user-initiated content viewing selection change when the user selects to not view the content recommendation and to no longer view the television show.

2. The method of claim 1, wherein the content recommendation is provided using one or more of a rating engine, recommendation engine and profile engine.

3. The method of claim 1, wherein the providing the content recommendation comprises:
   generating at least one recommendation of local or remote content.

4. The method of claim 1, wherein the change in system state representing a user-initiated content viewing selection change comprises activation of a client device.

5. The method of claim 1, wherein the change in system state representing a user-initiated content viewing selection change comprises activation of a television viewing system or set top box associated with the user.

6. The method of claim 1, wherein the change in system state representing a user-initiated content viewing selection change comprises a channel change event.

7. The method of claim 1, wherein the user selects by using a user-operated remote control device.

8. A system for displaying content recommendations to a viewer, the system comprising:
   a client device of a user monitoring content viewed on the content viewing device by the user;
   a profile generated, at the client device of the user, based on multiple sub-profiles that each include a type of affinity and time of day;
   incoming content processed, at the client device of the user, to identify television shows available for recommendation;
   the client device of the user comparing each of the other available television shows to the generated profile;
   a rating of each of the other available television shows based on the comparison of each of the other available television shows to the generated profile;

a determination of a content recommendation based on the ratings of each of the other available television shows; and a detection, while viewing the television show, of when a system state change representing a user-initiated content viewing selection change is requested to no longer view the television show;

a perceptible indicator providing, while viewing the television show and in response to detecting when the state change is requested and prior to implementing the requested system state change to no longer view the television show, a content recommendation on the content viewing device of the user including a visual or an audible indication that prompts the user with a selection for deciding whether to view the content recommendation;

an interruption of the viewing of the television show without implementing the system state change representing a user-initiated content viewing selection change by switching to the content recommendation when the user selects to view the content recommendation; and the client device interrupting the viewing of the television show by implementing the system state change representing a user-initiated content viewing selection change when the user selects to not view the content recommendation and to no longer view the television show.

9. The system of claim 8, wherein the change in system state representing a user-initiated content viewing selection change comprises activation of a client device.

10. The system of claim 8, wherein the change in system state representing a user-initiated content viewing selection change comprises activation of a television viewing system or set top box associated with the user.

11. The system of claim 8, wherein the change in system state representing a user-initiated content viewing selection change comprises a channel change event.

12. The system of claim 11, wherein the change channel event is associated with the user selecting a new channel.

13. The system of claim 8, wherein the content recommendation comprises at least one recommendation of local or remote content.

* * * * *